US012037811B2

(12) United States Patent
Magill

(10) Patent No.: US 12,037,811 B2
(45) Date of Patent: Jul. 16, 2024

(54) PICK-RESISTANT PIN TUMBLER LOCK ASSEMBLY

(71) Applicant: Andrew Magill, Boulder, CO (US)

(72) Inventor: Andrew Magill, Boulder, CO (US)

( * ) Notice: Subject to any disclaimer, the term of this patent is extended or adjusted under 35 U.S.C. 154(b) by 242 days.

(21) Appl. No.: 17/393,330

(22) Filed: Aug. 3, 2021

(65) Prior Publication Data

US 2023/0038968 A1 Feb. 9, 2023

(51) Int. Cl.

*E05B 27/00* (2006.01)
*E05B 27/02* (2006.01)
*E05B 27/08* (2006.01)

(52) U.S. Cl.

CPC ...... *E05B 27/0057* (2013.01); *E05B 27/0067* (2013.01); *E05B 27/0082* (2013.01); *E05B 27/02* (2013.01); *E05B 27/083* (2013.01)

(58) Field of Classification Search

CPC ............. E05B 27/0014; E05B 27/0017; E05B 27/0057; E05B 27/0067; E05B 27/0082; E05B 27/0083; E05B 27/02

See application file for complete search history.

(56) References Cited

U.S. PATENT DOCUMENTS 1,455,577 A * 5/1923 Epstein ............... E05B 27/0067 70/DIG. 37
2,287,175 A * 6/1942 Heyer ................. E05B 27/0082 70/495
2,391,832 A * 12/1945 Johnstone ............... E05B 9/084 70/367
RE30,198 E * 1/1980 Oliver ................. E05B 27/0039 70/494
4,282,731 A 8/1981 Taksony
4,388,815 A 6/1983 Lawler
5,752,400 A * 5/1998 Kim ...................... E05B 27/005 70/411
5,964,111 A 10/1999 Lambert
6,889,534 B2 * 5/2005 Koluch ............... E05B 27/0053 70/338
7,353,673 B2 4/2008 Houlihan et al.
8,096,155 B2 1/2012 Williams (Continued)

FOREIGN PATENT DOCUMENTS

WO 1991014064 A1 9/1991

OTHER PUBLICATIONS

Fey, Han, DOM ix Dimple key system, Feb. 2005.
Schlage Key Systems, Product and application reference guide, Rev. 05/18, 2018, United States.

*Primary Examiner* — Christopher J Boswell
(74) *Attorney, Agent, or Firm* — Nicholas J. Boyarski

(57) ABSTRACT

A pick-resistant lock assembly may include a housing having a cylindrical opening. The cylindrical opening may have a centerline. The housing may include a plurality of pin cavities intersecting the cylindrical opening. A plug may be rotatably mounted in the cylindrical opening. The plug may include a keyway and a plug axis. A slide bar pocket may be formed within the housing. The lock assembly may include a pin verification mechanism having a slide bar in the slide bar pocket. The pin verification mechanism may be concealed within the housing and may be inaccessible to an attacker inserting a hand tool through the keyway. Other examples may be described and claimed.

20 Claims, 15 Drawing Sheets

(56) References Cited

U.S. PATENT DOCUMENTS

| | | | | |
|---|---|---|---|---|
| 8,291,735 | B1 * | 10/2012 | Damikolas ............ | E05B 27/005 70/494 |
| 10,808,421 | B2 | 10/2020 | Clifford et al. | |
| 2021/0355709 | A1 * | 11/2021 | Bowley ................. | E05B 27/001 |

* cited by examiner

PICK-RESISTANT PIN TUMBLER LOCK ASSEMBLY

FIELD

This disclosure relates to pick-resistant lock assemblies and methods of manufacturing pick-resistant lock assemblies.

BACKGROUND

Conventional pin tumbler locks are susceptible to being picked. Lock picking techniques, such as single picking, raking, bumping, and combing, are nondestructive ways to manipulate and open a pin-tumbler lock without a key. An attacker may insert one or more hand tools into a keyway of the lock. For example, the attacker may insert a torsion tool into the keyway and apply a rotational force while using a pick tool to manipulate pin stacks relative to a shear line of the lock assembly to pick the lock.

To enhance security and make the lock more difficult to pick, some existing pin tumbler locks include a locking sidebar mechanism. The mechanism includes a locking sidebar that moves radially relative to a plug axis. When in a locked position, the sidebar extends beyond an outer diameter of the plug and seats in a notch in the housing. When deployed radially outward, the locking sidebar prevents relative rotation between the plug and the housing, even when the pin stacks are correctly manipulated relative to a shear line of the lock. When a special key having side bitting cuts is inserted into the keyway, the sidebar retracts from the notch, thereby allowing relative rotation between the plug and housing. A variation of this design requires a special key with angled bitting cuts. Unfortunately, in either case, pins of the locking sidebar mechanism can be accessed through the keyway, so despite having enhanced security compared to a basic pin tumbler lock, the locks are still susceptible to being picked.

A pin tumbler lock assembly is needed that is pick-resistant and compatible with standard keys.

SUMMARY

A pick-resistant pin tumbler lock assembly has been developed to address the shortcomings of existing pin tumbler locks. The lock assembly may be compatible with standard keys. The lock assembly may include a pin verification mechanism. The pin verification mechanism may be concealed within a housing of the lock assembly and may be inaccessible to an attacker inserting a hand tool through a keyway of the lock. The pin verification mechanism may be configured to simultaneously verify that each of a plurality of driver pins are in a correct position prior to allowing a plug of the lock assembly to rotate and unlock the lock assembly.

DETAILED DESCRIPTION

A lock assembly 100 is shown in FIGS. 1-5. The lock assembly 100 may be a pin tumbler lock assembly. The lock assembly 100 may be pin tumbler lock assembly with a physical security feature. The physical security feature may be a pin verification mechanism 120 that is inaccessible with a hand tool through a keyway 320 of the lock assembly 100. The pin verification mechanism 120 may render the lock assembly 100 pick-resistant against common nondestructive lock picking methods, such as single picking, raking, bumping, and combing.

Figure 3:
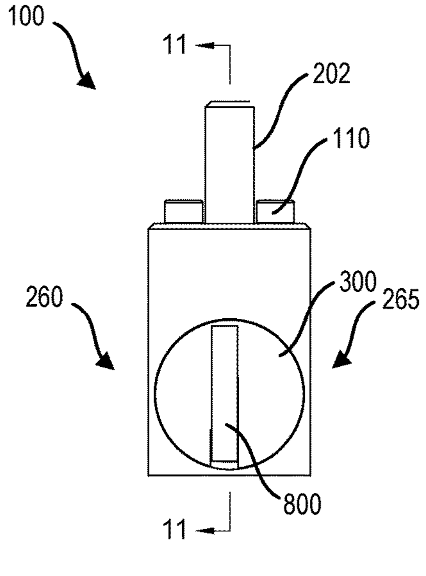
FIG. 3 shows a front view of the lock assembly and key of FIG. 1.
Figure 4:
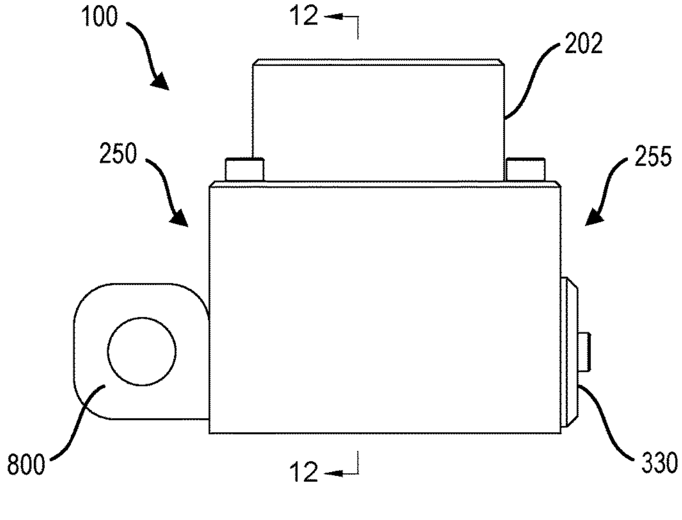
FIG. 4 shows a right side view of the lock assembly and key of FIG. 1.
Figure 22:
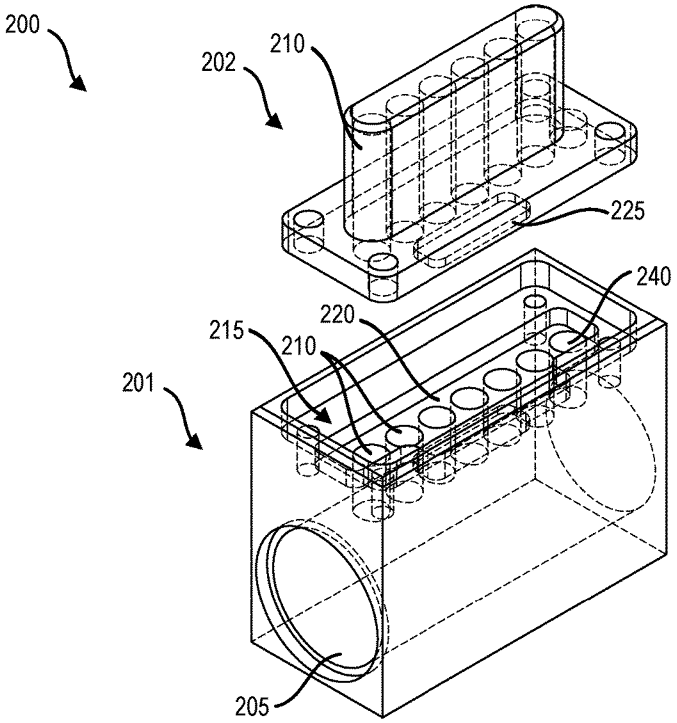
FIG. 22 shows a front perspective exploded view of the housing of the lock assembly of FIG. 1.
Figure 23:
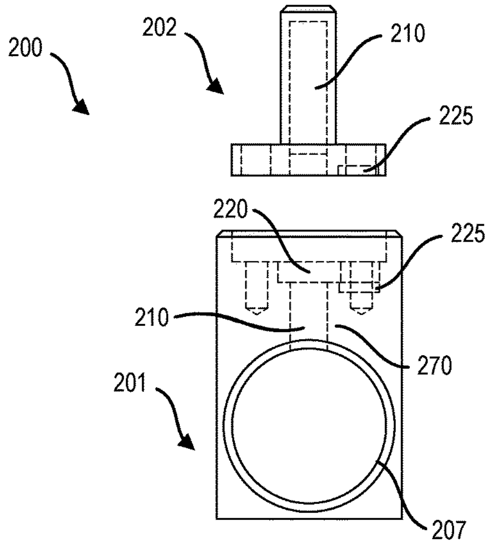
FIG. 23 shows a front exploded view of the housing of FIG. 22.
Figure 24:
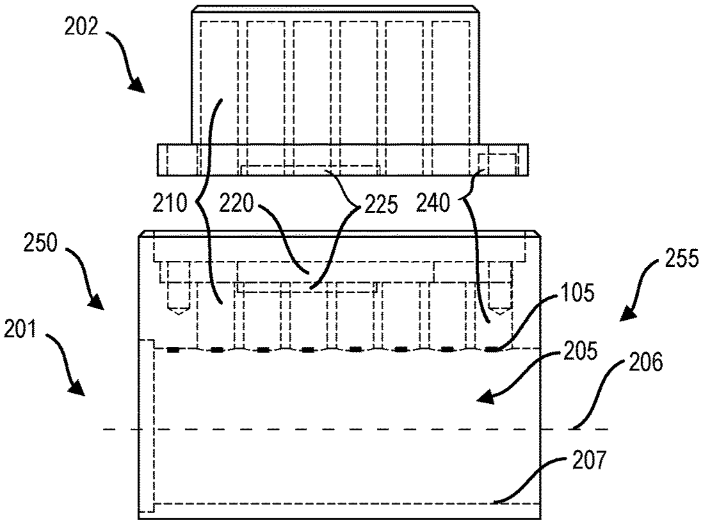
FIG. 24 shows a side exploded view of the housing of FIG. 22.

The lock assembly 100 may include a housing 200. The housing 200 may be a unitary shell. Alternately, as shown in FIGS. 22-24, the housing 200 may be a multi-piece shell that houses components of the lock assembly 100. The housing 200 may include a body portion 201. The housing 200 may include a cover portion 202. The cover portion 202 may be referred to as a bible. The body portion 201 may have a top opening 215 that is covered by the cover portion 202. The housing 200 may have a front portion 250 and a rear portion 255, as shown in FIG. 4. The front portion 250 may have a front surface 251. The rear portion may have a rear surface 256. The housing 200 may have a left side portion 260 and a right side portion 265, as shown in FIG. 3. In another example (not shown), the housing 200 may be substantially cylindrical.

Figure 10:
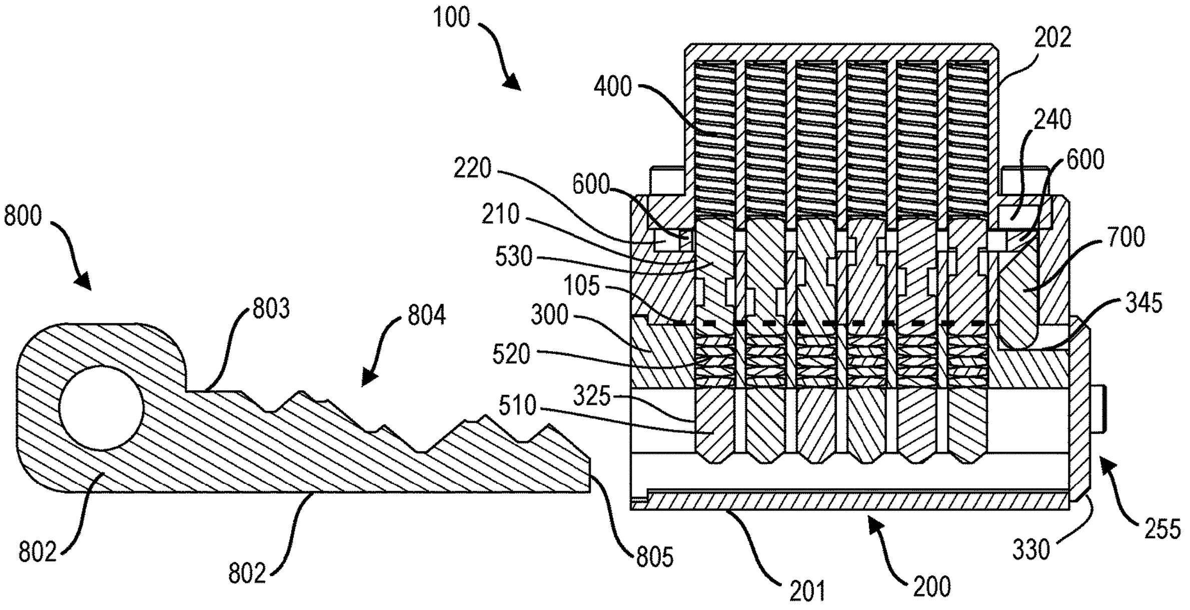
FIG. 10 shows a right side cross-sectional view of the lock assembly of FIG. 1 taken along section 11-11 of FIG. 3 with the key withdrawn.

The housing 200 may have an opening 205 configured to receive a rotatable plug 300. The opening 205 may be generally cylindrical. The opening 205 may be formed in the body portion 201 of the housing 200. The opening 205 may have a centerline 206. The opening 205 may be located in the front portion 250 of the housing 200. The opening 205 may extend horizontally from the front portion 250 to the rear portion 255 of the housing 200, as shown in FIG. 10. The opening 205 may extend through the housing 200.

The housing 200 may include a slide bar pocket 220. The slide bar pocket 220 may be configured to receive a slide bar 600. The slide bar pocket 220 may be concealed within the housing 200. The slide bar pocket 220 may be isolated from the opening 205 to prevent an attacker from accessing the slide bar pocket through the opening. The slide bar pocket 220 may be separated from the opening 205 by a separating portion 270 of the housing 200. The separating portion 270 may be a solid separating portion that prevents the slide bar pocket 220 from intersecting the opening 205. Consequently, the slide bar pocket 220 may be inaccessible by hand tools inserted through the keyway 320 when the lock assembly is fully assembled (e.g., inaccessible when the pin stacks 500 and the cam pin 700 are installed). The slide bar pocket 220 may be accessible by removing the cover portion 202 from the body portion 201 to reveal the top opening 215. In the example shown in FIG. 8, the slide bar pocket 220 may be formed in the body portion 201 of the housing 200. The slide bar pocket 220 may be a recess formed near the top opening 215. When the cover portion 202 is joined to the body portion 201, a bottom surface of the cover portion may bound a top side of the recess to define the slide bar pocket 220. In another example (not shown), the slide bar pocket 220 may be formed in the cover portion 202 of the housing 200. In yet another example (not shown), the slide bar pocket 220 may be a slot that extends inward through a wall of the housing 200.

The housing 200 may include a return spring pocket 225. The return spring pocket 225 may be concealed within the housing 200. The return spring pocket 225 may be accessible by removing the cover portion 202 from the body portion 201. In the example shown in FIG. 8, the return spring pocket 225 may be partially formed in the body portion 201 of the housing 200 and partially formed in the cover portion 202 of the housing 200. In another example, the return spring pocket 225 may be entirely formed in the body portion 201. In yet another example, the return spring pocket 225 may be entirely formed in the cover portion 202.

The housing 200 may include a plurality of pin cavities 210. The pin cavities 210 may be formed in the body portion 201. The pin cavities 210 may be formed partially in the body portion 201 and partially in the cover portion 202. When the cover portion 202 is joined to the body portion 201, corresponding pin cavities 210 within the body portion 201 and the cover portion 202 may align to form the plurality of pin cavities 210, as shown in FIG. 24. The pin cavities 210 may intersect the opening 205 within the housing 200. The pin cavities 210 may extend from the opening 205 to the cover portion 202. The pin cavities 210 may be arranged in a row. The pin cavities 210 may extend through the slide bar pocket 220. The pin cavities may have an upper portion, a lower portion, and a middle portion located between the upper portion and the lower portion. The slide bar pocket 220 may surround the middle portion of each pin cavity, as shown in FIGS. 22-24. In the example shown, the housing 200 includes six pin cavities 210 arranged in a row. In another example, the housing 200 may have more than six pin cavities 210. In yet another example, the housing 200 may have fewer than six pin cavities 210.

The cover portion 202 may be joined to the body portion 201 using, for example, threaded fasteners 110 or other suitable fasteners or joining techniques. The cover portion 202 may be removable from the body portion 201. Removing the cover portion 202 from the body portion 201 may permit access to the pin cavities 210 and cam pin cavity 240 within the housing 200 to facilitate assembly or service. In another example, the housing 200 may be permanently or semi-permanently sealed to prevent tampering with internal components of the lock assembly 100.

The lock assembly 100 may include a rotatable plug 300 housed in the opening 205 of the housing 200. The plug 300 may be substantially cylindrical. The plug 300 may be rotatably mounted within the opening 205. The plug 300 may have a front end 305, a rear end 310, and an outer surface 315 extending from the front end 305 to the rear end 310, as shown in FIGS. 25-28. The plug 300 may have a plug axis 340 about which the plug rotates when housed in the opening 205. The rotatable plug 300 may be made of brass or another suitable material.

The plug 300 may include a keyway 320. The keyway 320 may be configured to receive a standard key 800. The keyway 320 may be accessible at a front end 305 of the plug 300. The keyway 320 may extend horizontally and rearward from the front portion 305 of the plug 300 toward the rear portion 310 of the plug. The keyway 320 may extend fully or partially through the plug 300. The keyway 320 may have a height in a direction orthogonal to the plug axis 340 and extending from an outer surface 315 of the plug 300 to above the plug axis 340. The plug axis 340 may be located at least partially within the keyway 320.

The key 800 may be a standard key, as shown in FIG. 10. The key 800 may include a bow 801 and a blade 802 extending from the bow 801. The key 800 may have a shoulder 803 between the bow 801 and the blade 802. The key 800 may have a plurality of bitting cuts 804 on the blade. The bitting cuts 804 may be located between the shoulder 803 and a tip 805 of the blade 802. The bitting cuts 804 may be located along the top surface of the blade 802. By comparison, in one example, an existing pin tumbler lock with a locking sidebar mechanism may require a special key having a first set of bitting cuts along a top surface of the blade (e.g., to interact with the key pins) and a second set of bitting cuts along a side surface of the blade (e.g., to interact with sidebar pins). In another example, an existing pin tumbler lock with a locking sidebar mechanism may require a special key with angled bitting cuts. Requiring a key with two sets of bitting cuts or angled bitting cuts increases cost and complexity and is therefore undesirable. Moreover, requiring two sets of bitting cuts or angled bitting cuts increases the cost of duplicating the key, if necessary.

Figure 2:
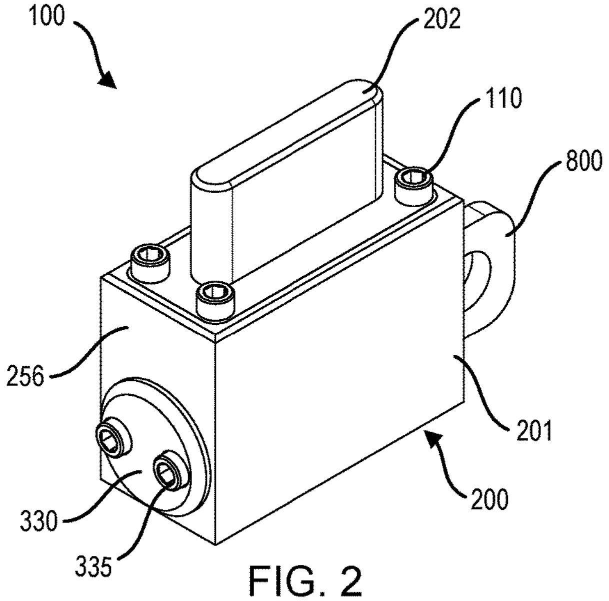
FIG. 2 shows a rear perspective view of the lock assembly and key of FIG. 1.
Figure 5:
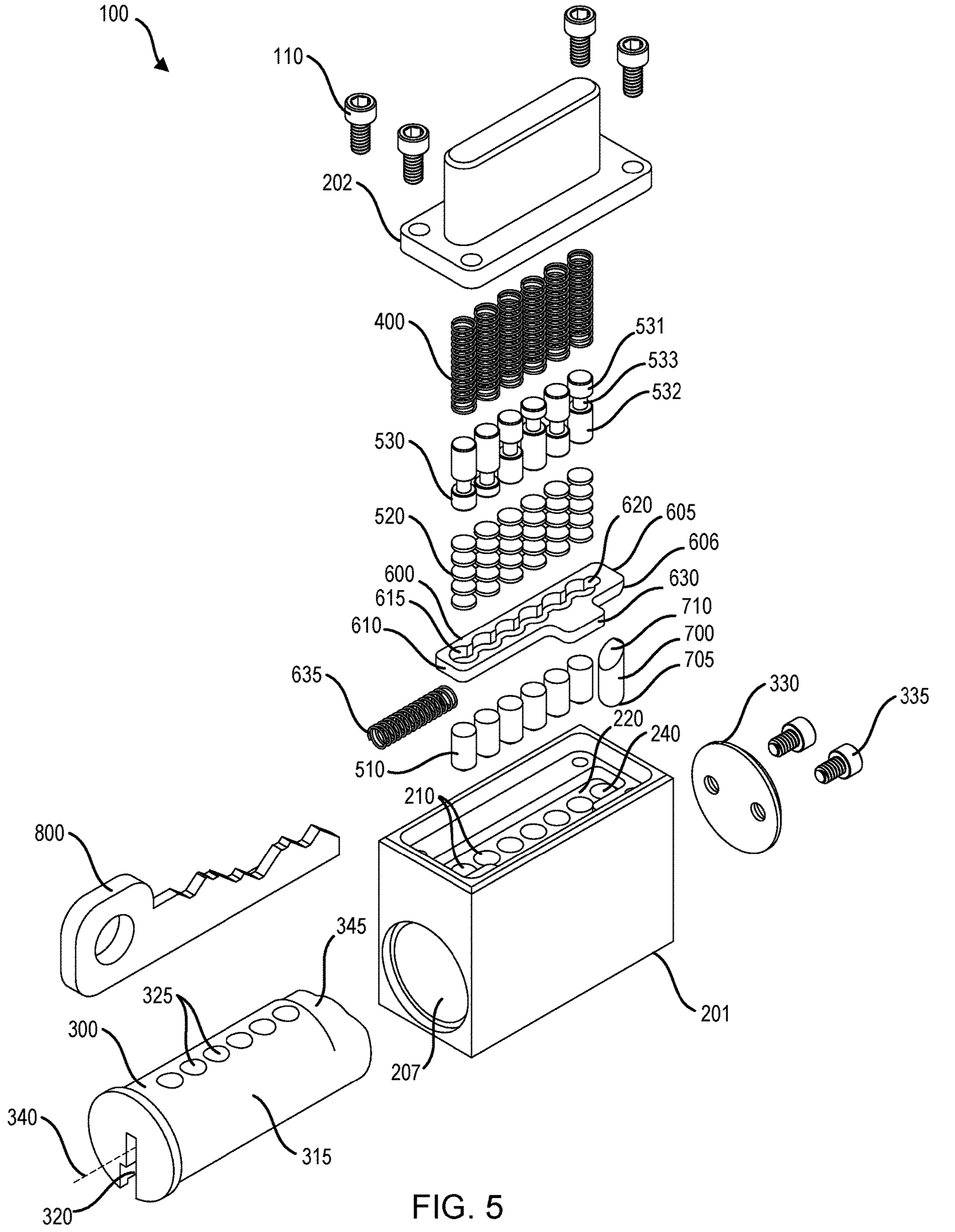
FIG. 5 shows an exploded view of the lock assembly and key of FIG. 1.

The lock assembly 100 may include a plug retainer 330. The plug retainer 330 may serve to rotatably retain the plug 300 within the opening 205. As shown in FIGS. 2 and 5, the plug retainer 330 may attach to a rear end 310 of the plug by one or more fasteners 335. The plug retainer 330 may have a diameter that is greater than a diameter of the opening 205, to prevent the plug retainer 330 from being drawn into the opening 205. When the key 800 is inserted into the keyway 320 and rotated, the plug 300 may rotate within the opening 205 and the plug retainer 330 may rotate against a rear surface 256 of the housing 200. In another example, the plug retainer 330 may be omitted and the plug 300 may extend beyond a rear surface of the housing 200, and a retention device, such as a circlip, may be installed in a circumferential groove on an outer surface of the plug 300.

Figure 25:
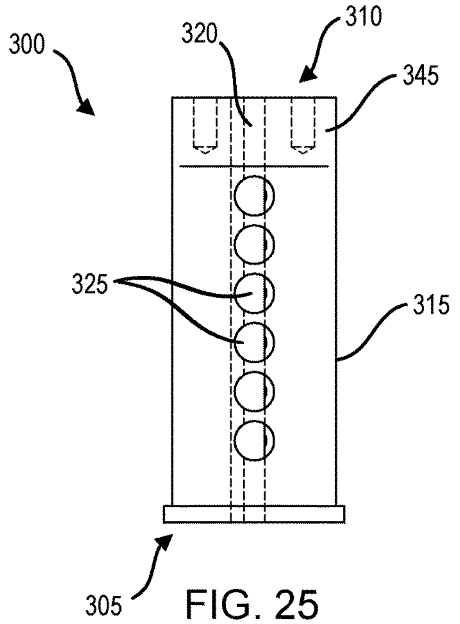
FIG. 25 shows a top view of the plug of the lock assembly of FIG. 1.
Figure 26:
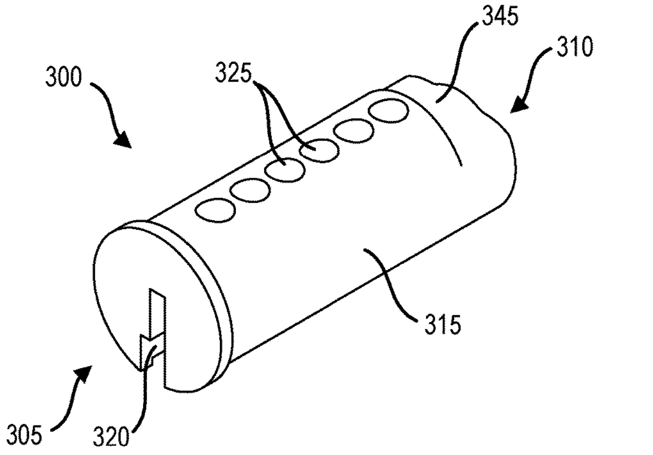
FIG. 26 shows a front perspective view of the plug of FIG. 25.
Figure 27:
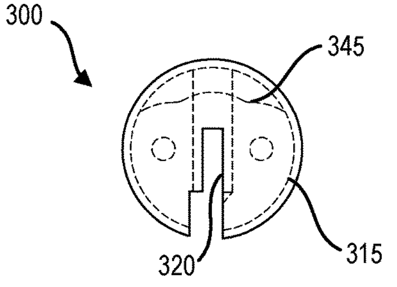
FIG. 27 shows a front view of the plug of FIG. 25.
Figure 28:
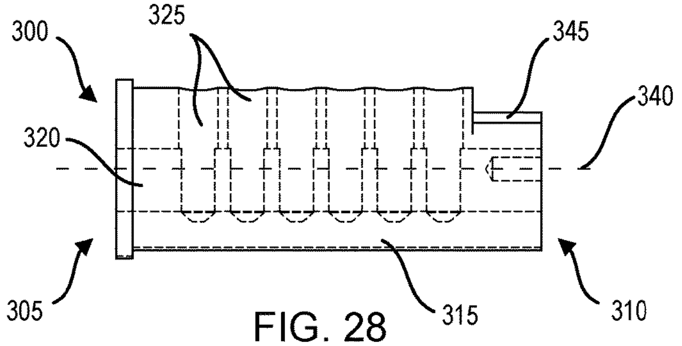
FIG. 28 shows a right side view of the plug of FIG. 25.

The plug 300 may include a plurality of pin openings 325 extending through the outer surface 315 to the keyway 320, as shown in FIGS. 25-27. The plurality of pin openings 325 may be arranged in a row. The spacing of the pin openings 325 may correspond to the spacing of the pin cavities 210, as show in in FIG. 10. When the plug 300 is in a home position, a centerline of each pin opening 325 may substantially align with a centerline of each corresponding pin cavity 210 in the housing 200, as shown in FIGS. 10-12, thereby providing a continuous cavity extending from the housing 200 to the keyway 320.

Figure 31:
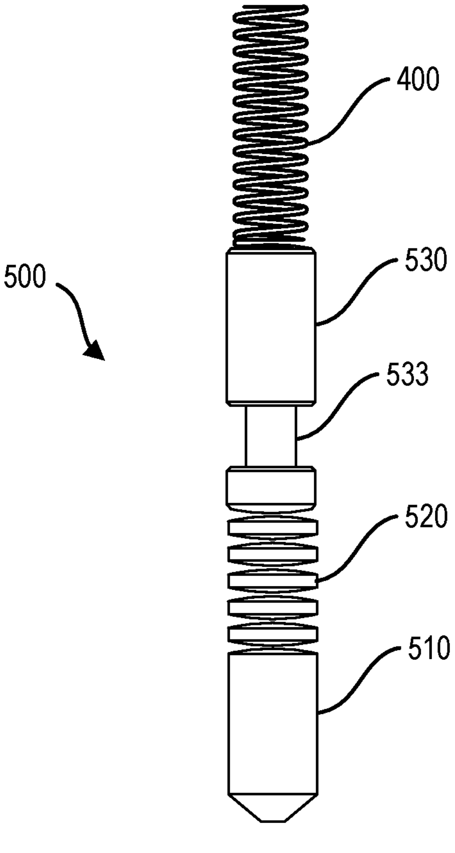
FIG. 31 shows a side view of an example pin stack and pin spring of the lock assembly of FIG. 1.
Figure 32:
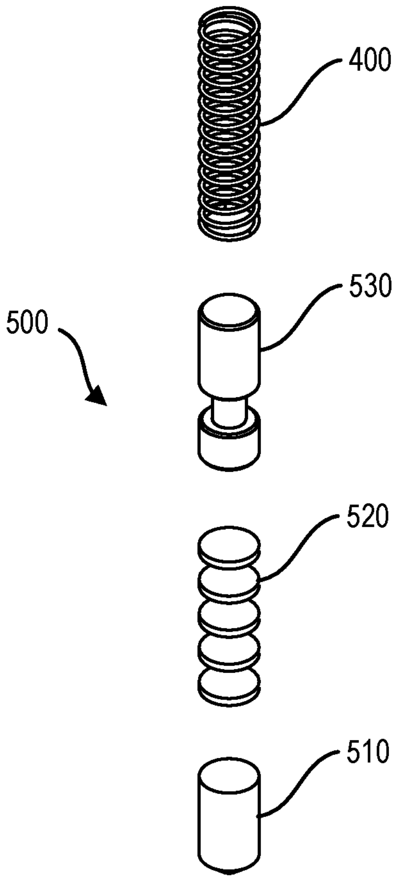
FIG. 32 shows a perspective exploded view of the pin stack and pin spring of FIG. 31.

The lock assembly 100 may include a plurality of pin stacks 500. An example pin stack 500 is shown in FIGS. 31 and 32. The pin stack 500 may include a key pin 510, a driver pin 530, and a plurality of spacer pins 520 between the key pin 510 and the driver pin 530. Each pin stack 500 may be partially housed in one of the pin cavities 210 and partially housed in a corresponding pin opening 325, as shown in FIGS. 5 and 10-12.

The lock assembly may include a plurality of pin springs 400. Each pin spring 400 may be housed in one of the pin cavities 210. Each pin spring 400 may be located between a closed end of a respective pin cavity 210 and a respective driver pin 530, as shown in FIGS. 10-12. The pin spring 400 may apply a spring force to the pin stack 500, thereby forcing the pin stack 500 toward the opening 205. FIG. 31 shows a side view of an example pin stack 500 and pin spring 400. FIG. 32 shows an exploded view of the example pin stack and pin spring 400 of FIG. 31 is shown in FIG. 32.

Figure 11:
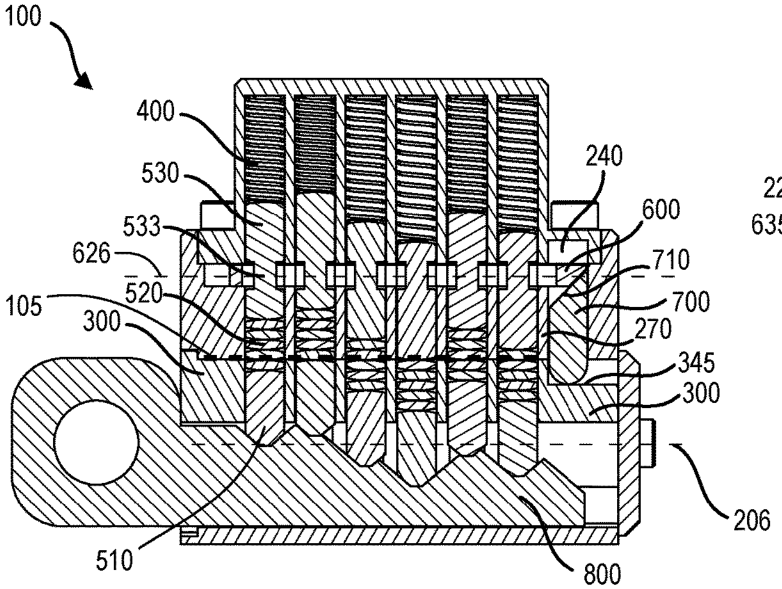
FIG. 11 shows a right side cross-sectional view of the lock assembly and key of FIG. 1 taken along section 11-11 of FIG. 3.
Figure 12:
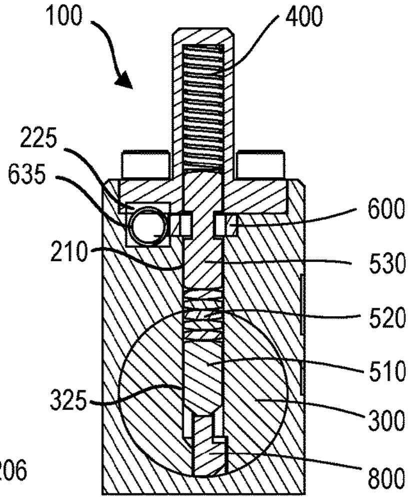
FIG. 12 shows a rear cross sectional view of the lock assembly and key of FIG. 1 taken along section 12-12 of FIG. 4.

When the plug 300 is in the home position, the plurality of pin cavities 210 and the plurality of pin openings 325 may be aligned, and each pin stack 500 can freely move up and down within its respective pin cavity 210 and pin opening 325 when the key 800 is inserted into the keyway 320, as shown in FIGS. 10-12.

Figure 30A:
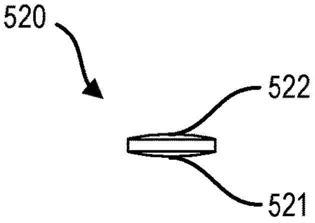
FIG. 30A shows a spacer pin of the lock assembly of FIG. 1.
Figure 30B:
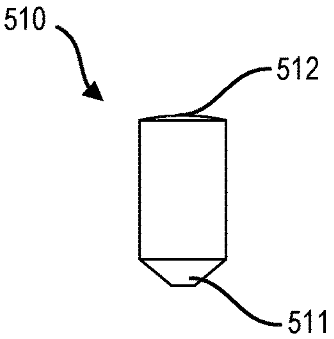
FIG. 30B shows a key pin of the lock assembly of FIG. 1.

An example key pin 510 is shown in FIG. 30B. The key pin 510 may be configured to contact the key 800. The key pin 510 may have a first end 511 and a second end 512. The first end may be a tapered end that is configured to interact with the bitting cuts 804 on the key 800, as shown in FIG. 11. The second end may be flat or slightly rounded to facilitate smooth movement within the pin cavity 210 and smooth interaction with the pin stack 500.

An example spacer pin 520 is shown in FIG. 30A. The spacer pin 530 may be positioned between the key pin 510 and the driver pin 530. The spacer pin 520 may have a first end 521 and a second end 522. The first and second ends may be flat or slightly rounded to facilitate smooth movement within the pin cavity 210 and smooth interaction with the pin stack 500.

A shear line 105 may exist where the plug 300 meets an inner cylindrical surface 207 of the opening 205 in the housing 200. The shear line 105 may be located between the plurality of pin cavities 210 in the housing 200 and the plurality of pin openings 325 in the plug 300. In FIG. 10, the plug 300 is prevented from rotating at the shear line 105 by the presence of the plurality of driver pins 530 extending from the pin cavities 210, through the shear line, to the pin openings 325. When the correct key 800 is inserted into the keyway 320, as shown in FIG. 11, the pin stacks 500 are lifted and the driver pins 530 move above the shear line 105, thereby enabling the plug 300 to rotate at the shear line 105. In the example of FIG. 11, the key pins 510 remain below the shear line 105 when the correct key is inserted into the keyway 320, and the shear line 105 passes adjacent to a spacer pin 520 in each pin stack 500.

Figure 29:
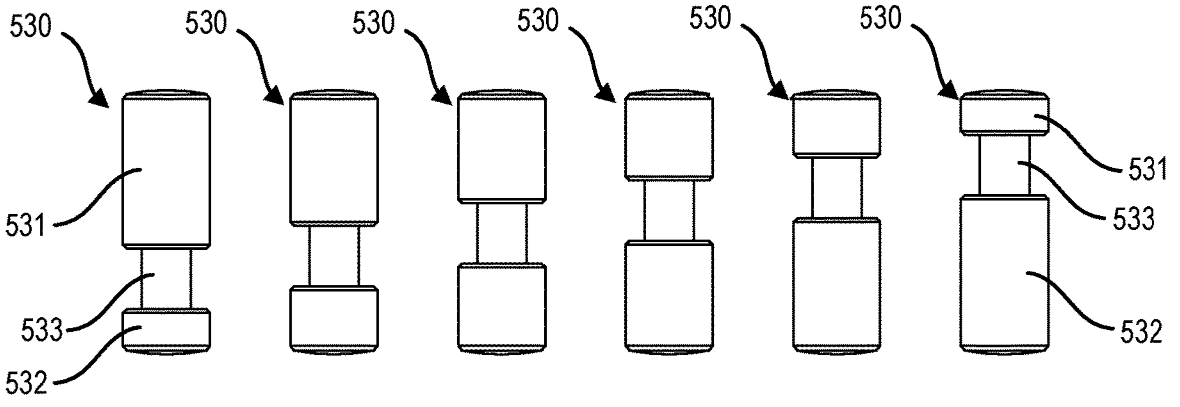
FIG. 29 shows a plurality of driver pins of the lock assembly of FIG. 1.

A plurality of driver pins 530 are shown in FIG. 29. Each driver pin 530 may include an upper portion 531, a lower portion 532, and a neck portion 533 located between the upper portion 531 and the lower portion 532. Each driver pin 530 may be substantially symmetrical along a centerline to allow it to spin within a respective pin cavity 210 without altering operation of the pin verification mechanism 120. When the drive pins 530 are installed in the pin cavities 210, each neck portion 533 may be inaccessible from the keyway 320 to prevent manipulation by an attacker. The neck portion 533 may have a diameter that is less than the diameter of the upper portion 531. The neck portion 533 may have a diameter that is less than the diameter of the lower portion 532. The upper portion 531 may have a diameter that is substantially equal to a diameter of the lower portion 532 to facilitate smooth movement within the pin cavity 210 (e.g., to avoid seizing). The diameter of the upper portion 531 may be greater than a width of a slot 620 in the slide bar 600. The diameter of the lower portion 532 may be greater than a width of the slot 620 in the slide bar 600. The diameter of the upper portion 531 may be less than a diameter of a corresponding clearance hole 615 in the slide bar 600. The diameter of the lower portion 532 may be less than a diameter of a corresponding clearance hole 615 in the slide bar 600. The diameter of the neck portion may be less than the width of the slot in the slide bar 600.

A variety of driver pins 530 may be manufactured, each having a neck portion 533 located at a different height relative to the upper portion 531 and lower portion 532. Combinations of nonidentical driver pins 530 may be used to produce unique locks that require unique keys. A first driver pin 530 can be duplicated and flipped to produce a second driver pin with a neck portion at a different height than the neck portion of the first driver pin. In the example of FIG. 29, three driver pin configurations are duplicated and then flipped to produce a unique six pin configuration. This approach of creating reversible driver pins may simplify manufacturing and reduce cost.

The lock assembly 100 may include a pin verification mechanism 120. The pin verification mechanism 120 may be concealed within the housing 200 and inaccessible to an attacker inserting a hand tool through the keyway 320. The pin verification mechanism 120 may be configured to simultaneously verify that the neck portion 533 of each of the plurality of driver pins 530 is at a correct location (e.g., a correct height within the pin cavity 210 relative to the centerline 206 of the opening 205) before allowing the plug 300 to rotate and unlock the lock assembly 100. The pin verification mechanism 120 may convert rotational movement of the plug 300 into translational movement of the slide bar 600 to facilitate driver pin 530 verification. The pin verification mechanism 120 may include a plurality of components. The pin verification mechanism 120 may include a cam surface 345, a cam pin 700, a slide bar 600, and a return spring 635.

Figure 30C:
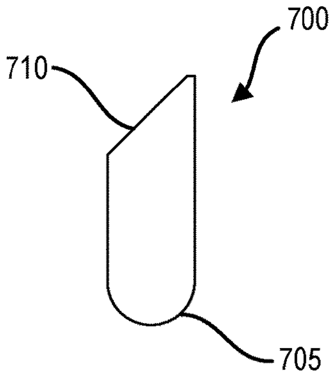
FIG. 30C shows a cam pin of the lock assembly of FIG. 1.

The cam pin 700 may have a first end and a second end opposite the first end. The first end may have a rounded surface 705. The second end may include a beveled surface 710. The rounded surface 705 may be configured to ride on the cam surface 345 as the plug 300 rotates and move up and down within the cam pin cavity 240 to facilitate smooth operation of the lock assembly 100. The cam pin 700 may move radially outward along a travel path that is substantially orthogonal to the centerline 206 of the opening 205. The beveled surface 710 may facilitate deployment and retraction of the slide bar 600 when the cam pin 700 is moved up or down, respectively, in the cam pin cavity 240 by the cam surface 345. The beveled surface 710 may extend across all or a portion of the second end of the cam pin 700. The beveled surface 710 may be substantially planar, as shown in FIG. 30C. Alternately, the beveled surface 710 may be contoured. The beveled surface 710 may be any suitable surface that permits force from the cam pin 700 to be effectively transferred to the slide bar 600 to effect translation of the slide bar.

The beveled surface 710 of the cam pin 700 may serve as a direction-changing mechanism that changes the direction of the force about ninety degrees from the cam pin 700 to the slide bar 600. The pin verification mechanism 120 may include any suitable direction-changing mechanism to convert rotational force from the plug 300 to translational force that advances the slide bar 600 to verify positions of the driver pins 530.

The cam pin cavity 240 may be configured to receive the cam pin 700. The cam pin cavity 240 may be formed in the housing 200. The cam pin cavity 240 may be formed in the body portion 201. The cam pin cavity 240 may be formed partially in the body portion 201 and partially in the cover portion 202. When the cover portion 202 is joined to the body portion 201, corresponding cavities within the body portion 201 and the cover portion 202 may together form the cam pin cavity 240, as shown in FIG. 24. The cam pin cavity 240 may intersect the opening 205 within the housing 200. The cam pin cavity 240 may extend from the opening 205 into the cover portion 202. The cam pin cavity 240 may extend through the slide bar pocket 220. The slide bar pocket 220 may surround a portion of the cam pin cavity 240. Unlike the pin cavities 210, which are designed to align with a corresponding pin opening 325 in the plug 300 when the plug is in the home position, there may be no opening in the plug 300 that aligns with the cam pin cavity 240. This configuration, which is shown in FIG. 11, prevents an attacker from manipulating the cam pin 700 by inserting a tool through the keyway 320. The cam pin cavity 240 and cam pin 700 may be isolated from the keyway 320 to prevent manipulation by an attacker.

Figure 15:
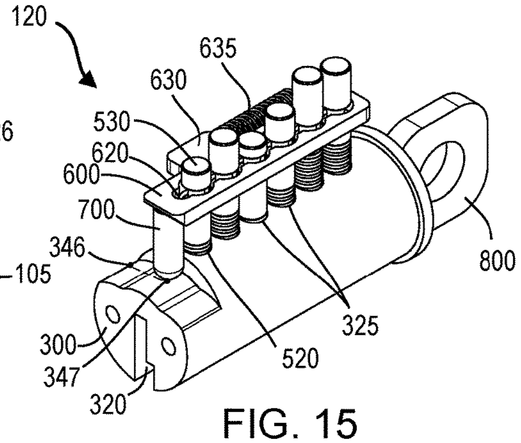
FIG. 15 shows a rear perspective view of the pin verification mechanism of FIG. 13.
Figure 21:
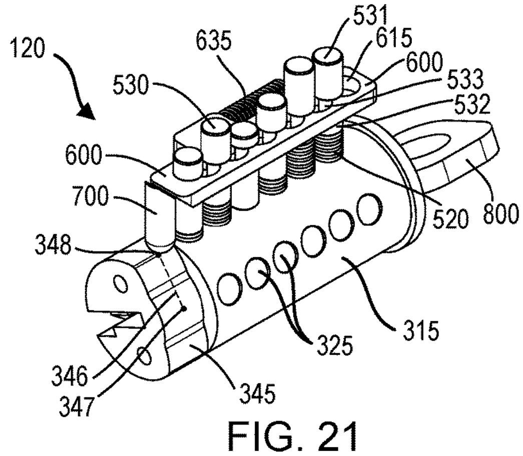
FIG. 21 shows a rear perspective view of the pin verification mechanism of FIG. 19.

The cam surface 345 may be a contoured surface. The cam surface 345 may be located on an exterior surface of the plug 300. As the plug 300 rotates, the rounded surface 705 of the cam pin 700 may ride on the cam surface 345. As the plug 300 rotates, the rounded surface 705 of the cam pin 700 may travel along a cam pin pathway 346 on the cam surface 345. When the plug 300 is in the home position, the rounded surface 705 of the cam pin 700 may contact the cam surface 345 at a first point 347 on the cam pin pathway 346, as shown in FIG. 15. When the plug 300 is rotated to the pin verification position, the rounded surface 705 of the cam pin 700 may contact the cam surface 345 at a second point 348 on the cam pin pathway 346, as shown in FIG. 21. Measured radially, the second point 348 may be located farther from the plug axis 340 than the first point 347. In the example shown in FIG. 15, the cam surface 345 is located at or near a rear end of the plug 300. In another example (shown in FIG. 37A), a cam surface 345 may be located at or near a front end of the plug 300. In yet another example (not shown), the cam surface 345 may be located anywhere between the front end and the rear end of the plug 300.

Figure 6A:
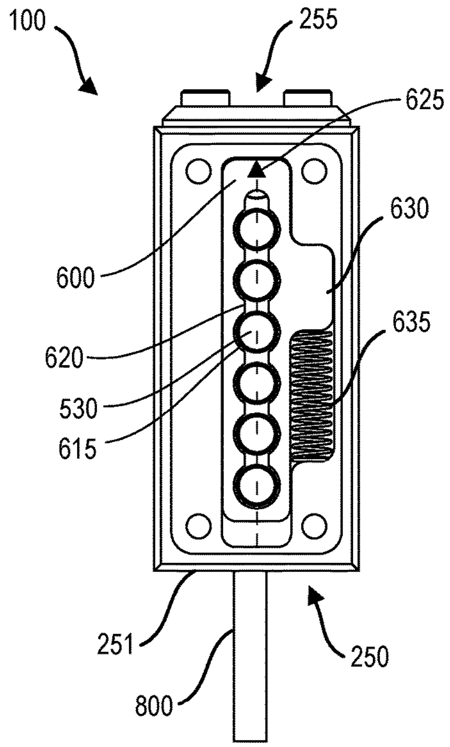
FIG. 6A shows a top view of the lock assembly and key of FIG. 1 with a cover and pin springs removed and the slide bar in a home position.
Figure 6B:
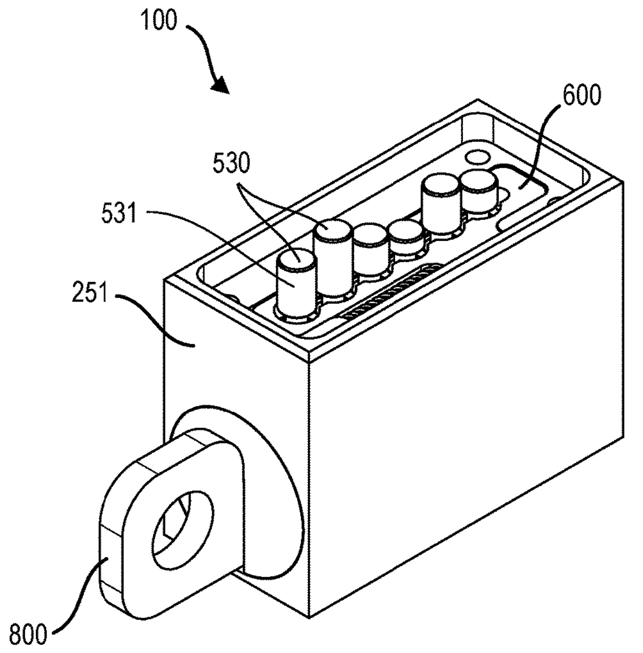
FIG. 6B shows a top perspective view of the lock assembly and key of FIG. 1 with a cover and pin springs removed and the slide bar in the home position.
Figure 7A:
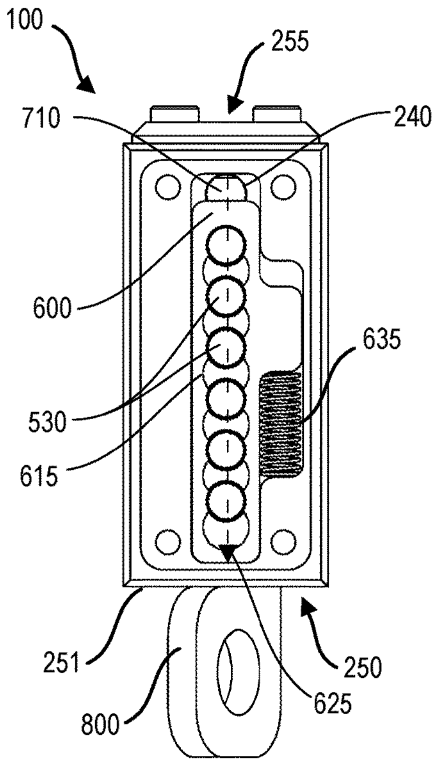
FIG. 7A shows a top view of the lock assembly and key of FIG. 1 with a cover and pin springs removed and the slide bar in a pin verification position.
Figure 7B:
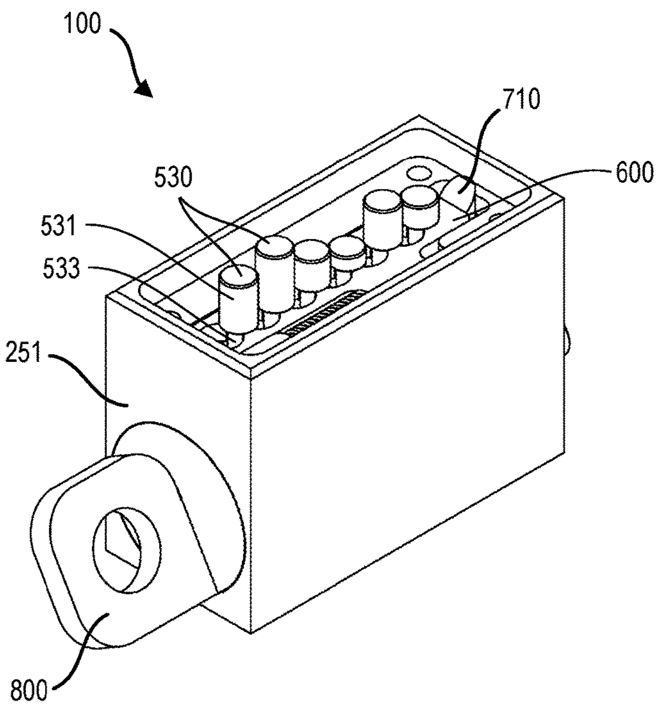
FIG. 7B shows a top perspective view of the lock assembly and key of FIG. 1 with a cover and pin springs removed and the slide bar in the pin verification position.

The slide bar 600 may be positioned in the slide bar pocket 220. The slide bar may have a first end 605 and a second end 610. The slide bar 600 may be configured to slide within the slide bar pocket 220 and move linearly along a travel path 625 that extends from the home position to the pin verification position. In the example shown in FIGS. 6A and 7A, the travel path 625 may be a linear path that is parallel to the centerline 206 of the opening 205. The travel path 625 may be located on a plane 626 that does not intersect with the opening 205, as shown in FIG. 11. The travel path 625 may extend front-to-rear within the housing 200. FIGS. 6A and 6B show the slide bar 600 in the home position. FIGS. 7A and 7B show the slide bar 600 in the pin verification position. The slide bar 600 may be isolated from the keyway 320 to prevent manipulation by an attacker. The slide bar 600 may be isolated from the keyway 320 by a solid body portion of the housing 200.

The slide bar 600 may include a spring arm 630. The spring arm 630 may extend from a side portion of the slide bar 600, as shown in FIG. 6. The spring arm 630 may engage a return spring 635. The return spring 635 may be positioned between the slide bar 600 and a surface of the return spring pocket 225. The spring arm 630 provides a compact pin verification mechanism. In another example (not shown) where the size of the pin verification mechanism 120 is not a design constraint, the return spring 635 may be positioned in the slide bar pocket 220 between the second end 610 of the slide bar 600 and a front surface of the slide bar pocket 220, and the spring arm 630 may be omitted.

The slide bar 600 may be actuated by the cam pin 700. When the slide bar 600 is actuated by the cam pin 700, the spring arm 630 may compress the return spring 635 within the return spring pocket 225, as shown in FIGS. 7A and 7B, thereby storing potential energy in the return spring 635 that may be used later to return the slide bar 600 and the cam pin 700 back to their respective home positions. For example, when the cam pin 700 is retracted and not forcing the slide bar 600 toward a pin verification position, the return spring 635 may apply a spring force to the slide bar 600 to return the slide bar 600 to the home position.

When actuated by the cam pin 700, the slide bar 600 may slide from the home position to a pin verification position within the slide bar pocket 220. The slide bar 600 may be configured to test whether the bitting cuts 804 of the key 800 are correct by simultaneously testing positions of the neck portions 533 of the plurality of driver pins 530 when the plug 300 is rotated and the driver pins 530 are isolated from physical manipulation via the keyway 320.

The slide bar 600 may include a plurality of clearance portions. In the example shown in FIG. 9B, the clearance portions may be clearance holes 615. The plurality of clearance holes 615 may be arranged in a row. The spacing of the clearance holes 615 may correspond to the spacing of the pin cavities 210. When the slide bar 600 is in the home position, as shown in FIGS. 6A and 6B, the clearance holes 615 may align with the pin cavities 210, thereby allowing the driver pins 530 to move freely up and down through the clearance holes 615 when the key 800 is inserted into the keyway 320. When the slide bar 600 is in pin verification position, the clearance holes 615 may be misaligned from the pin cavities 210 and partially obstruct the pin cavities 210, as shown in FIGS. 7A and 7B. When the slide bar 600 is in pin verification position, centerlines of the clearance holes 615 may be substantially parallel to and offset from centerlines of corresponding pin cavities 210.

Figure 9A:
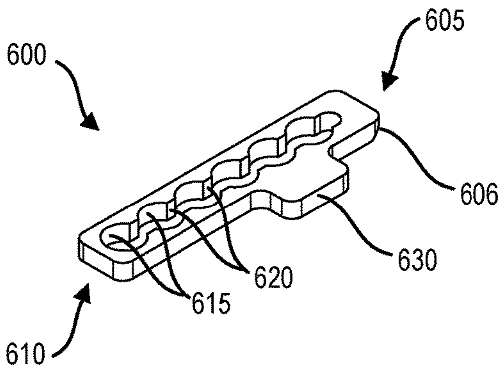
FIG. 9A shows a top perspective view of the slide bar.
Figure 9B:
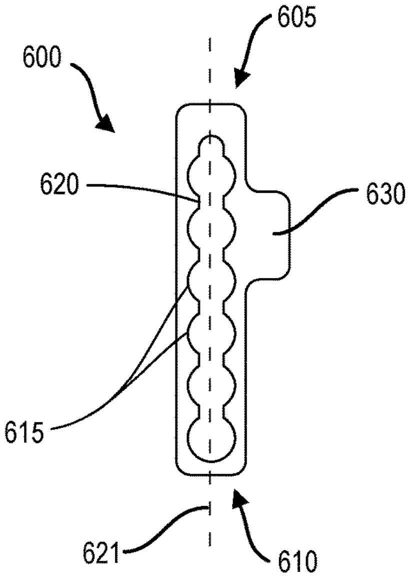
FIG. 9B shows a top view of the slide bar.
Figure 9C:
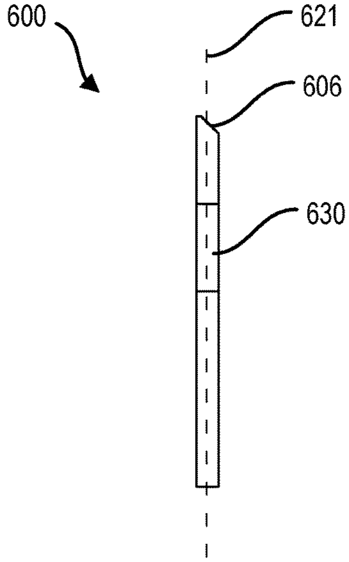
FIG. 9C shows a right side view of the slide bar.

An example of the slot 620 in the slide bar 600 is shown in FIGS. 9A-9C. The slot 620 may intersect the plurality of clearance holes 615. The slot 620 may connect the plurality of clearance holes 615. When the slide bar 600 is installed in the slide bar pocket 220, a centerline 621 of the slot 620 may be substantially orthogonal to the centerlines of the plurality of pin cavities 210. When the slide bar 600 is installed in the slide bar pocket 220, the centerline 621 of the slot 620 may be substantially orthogonal to the centerline of the cam pin cavity 240. When the slide bar 600 is installed in the slide bar pocket 220, the centerline 621 of the slot 620 may be substantially parallel to and offset from the centerline 206 of the opening 205.

When the slide bar 600 is in the home position, as shown in FIGS. 6A and 6B, the slot 620 may be positioned between adjacent pin cavities 210 and not interfere with the up and down movement of the driver pins 530 within the pin cavities 210. When the slide bar 600 is slid toward the pin verification position, the slot 620 may partially obstruct each of the pin cavities 210 and only fully advance to the pin verification position if the neck portions 533 of each driver pin are at the correct height, as shown in FIGS. 7A and 7B.

Figure 13:
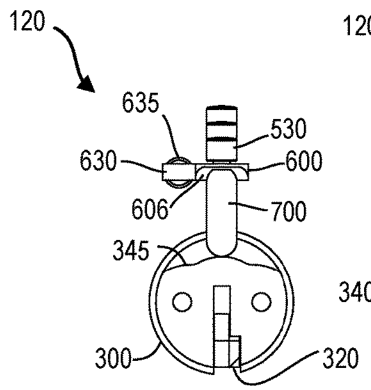
FIG. 13 shows a rear end view of a pin verification mechanism with the plug and slide bar in a home position and the plug at a zero-degree orientation.
Figure 14:
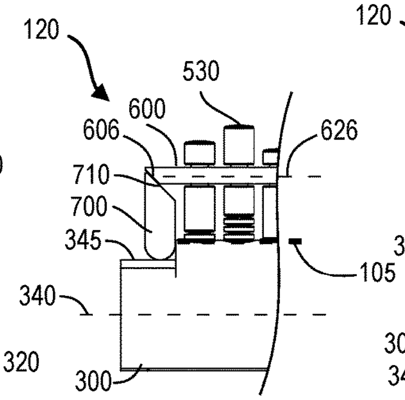
FIG. 14 shows a partial right side view of the pin verification mechanism of FIG. 13.
Figure 16:
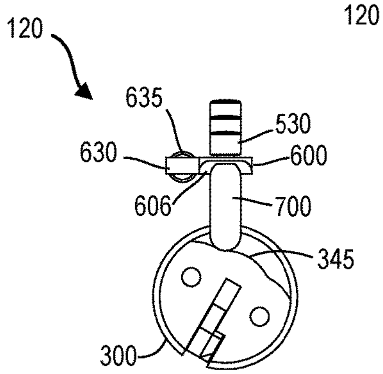
FIG. 16 shows a rear end view of the pin verification mechanism with the plug and slide part way between a home position and a pin verification position.
Figure 17:
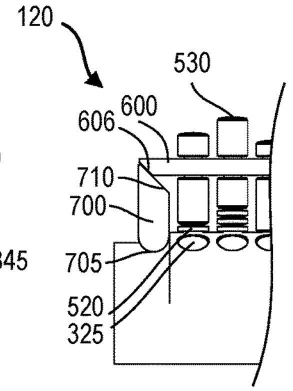
FIG. 17 shows a partial side view of the pin verification mechanism of FIG. 16.
Figure 18:
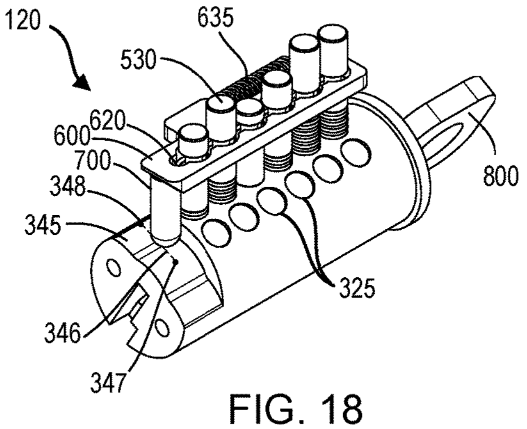
FIG. 18 shows a rear perspective view of the pin verification mechanism of FIG. 16.
Figure 19:
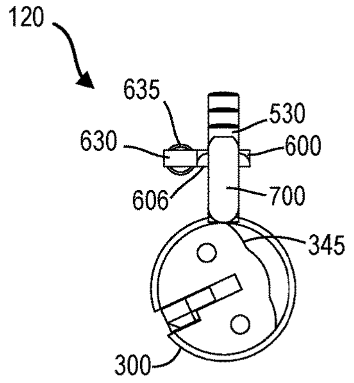
FIG. 19 shows a rear end view of the pin verification mechanism with the plug and slide bar in the pin verification position.
Figure 20:
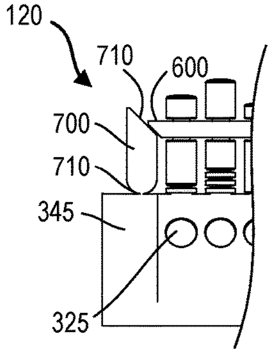
FIG. 20 shows a partial side view of the pin verification mechanism of FIG. 19.

FIGS. 13-21 show the lock assembly 100 with the housing 200 omitted to reveal the pin verification mechanism 120. FIGS. 13-15 show the plug 300 and slide bar 600 in the home position. FIGS. 19-21 show the plug 300 and slide bar 600 in the pin verification position. FIGS. 16-18 shows the plug in a partially rotated position, between the home position and the pin verification position.

In FIGS. 13-15, the cam pin 700 is in a home position, and the slide bar 600 is in a home position. With the slide bar 600 in the home position, the clearance holes 615 are aligned with the pin openings 325, which allows the pin stacks 500 to freely move up and down in response to the key 800 being inserted.

In FIGS. 16-18, the plug 300 is partially rotated. Because the correct key 800 is used, each of the driver pins 530 is lifted above the pin openings 325, and the plug 300 is able to rotate at the shear line 105, as shown in FIG. 18.

In FIGS. 13-21, the correct key 800 is inserted in the keyway 320, which causes the neck portion 533 of each driver pin 530 to rise to a height that aligns with the slot 620 of the slide bar 600, which enables the slide bar 600 to advance from the home position to the pin verification position when the plug 300 is rotated, as shown in FIG. 19-21. If an incorrect key is inserted in the keyway 320, the neck portion 533 of each driver pin 530 will not align with the slot 620 of the slide bar 600, and the plug 300 will be prevented from rotating by the pin verification mechanism 120.

In FIGS. 19-21, the plug 300 is rotated to the pin verification position and the slide bar 600 is fully advanced from the home position to the pin verification position. When the plug 300 rotates from the home position to the pin verification position, the cam pin 700 rides on the cam surface 345 and is raised upward to actuate the slide bar 600 via interaction of the beveled surfaces (606, 710). More specifically, the beveled surface of the cam pin 700 presses upward against the beveled surface of the slide bar 600 and redirects a vertical force to a horizontal force that forces the slide bar 600 toward a front of the slide bar pocket 220.

When the slide bar 600 is actuated toward the pin verification position as shown in FIG. 19-21, the return spring 635 may become compressed within the return spring pocket 225 and, in response, apply a spring force to the slide bar 600 that encourages the slide bar 600 to return to the home position when the plug 300 is returned to the home position.

Likewise, the return spring 635 may serve to encourage the cam pin 700 back to return to the home position as the beveled surface 606 of the slide bar 600 transfers the spring force from the return spring to the beveled surface 710 of the cam pin 700.

Figure 1:
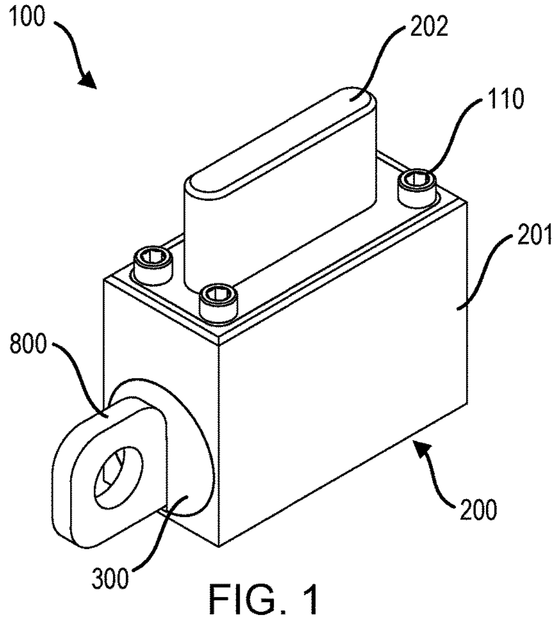
FIG. 1 shows a front perspective view of a lock assembly with a standard key inserted into a keyway of the lock assembly.
Figure 33A:
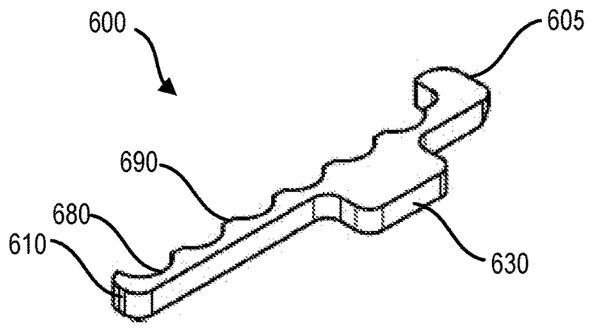
FIG. 33A shows a top perspective view of a slide bar.
Figure 33B:
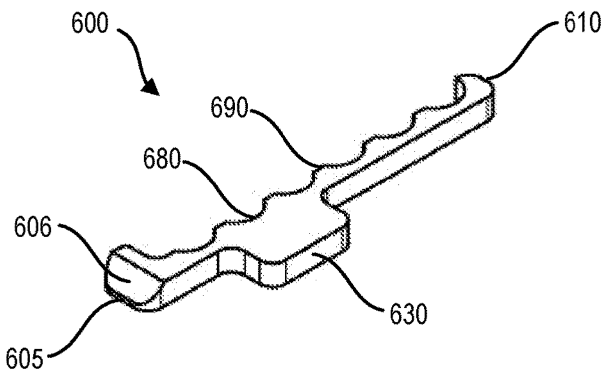
FIG. 33B shows a bottom perspective view of the slide bar of FIG. 33A.
Figure 33C:
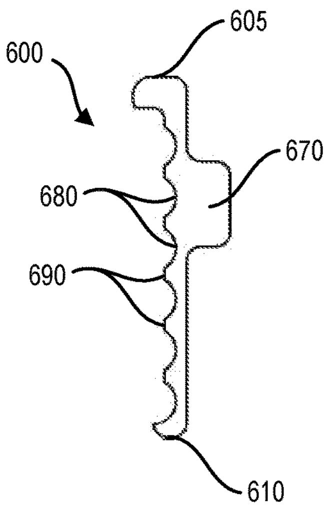
FIG. 33C shows a top view of the slide bar of FIG. 33A.
Figure 33D:
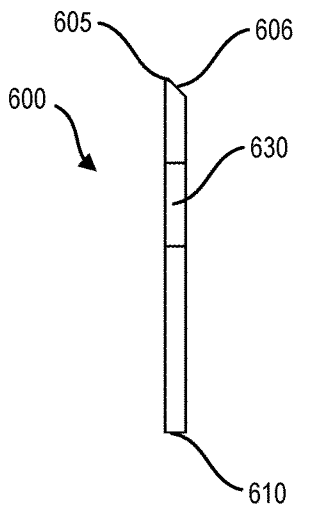
FIG. 33D shows a right side view of the slide bar of FIG. 33A.
Figure 33E:
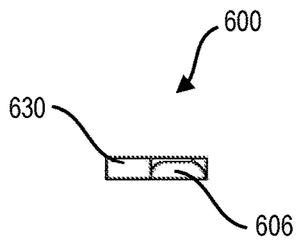
FIG. 33E shows an end view of the slide bar of FIG. 33A.
Figure 34:
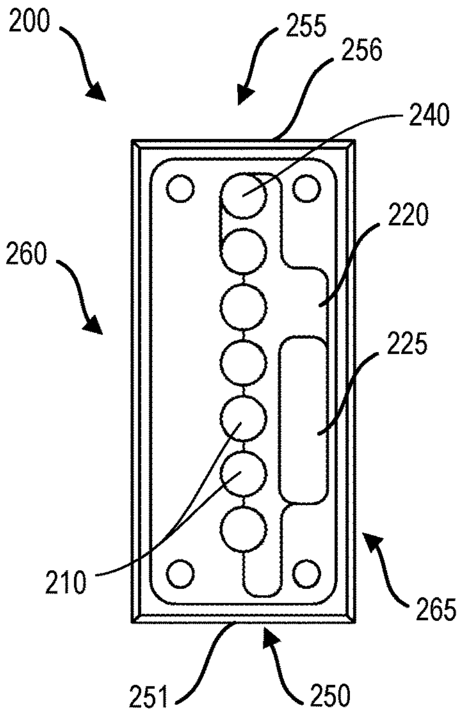
FIG. 34 shows a body portion of a housing with no components installed and an alternate slide bar pocket configuration.
Figure 35A:
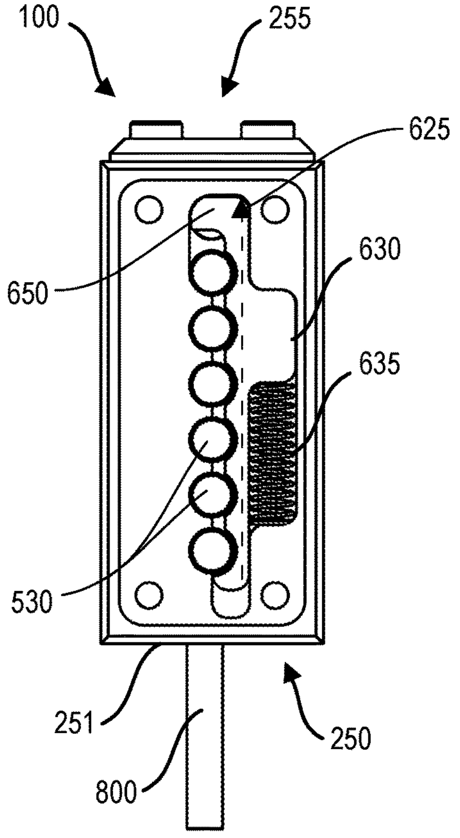
FIG. 35A shows a top view of a lock assembly with the cover portion and pin springs removed, the modified body portion of FIG. 34, and the slide bar of FIG. 33A in a home position.

In the example of FIG. 35A, the lock assembly 100 may be similar to the lock assembly of FIG. 1, but may include a modified body portion 201 as shown in FIG. 34 and a modified slide bar 600 as shown in FIGS. 33A-E. The modified body portion 201 may include a modified slide bar pocket 220 that is configured to receive the slide bar 600 shown in FIGS. 33A-E. The slide bar pocket 220 may only partially surround the pin cavities 210. Aside from the modified slide bar pocket 220, the body portion 201 may be substantially similar to the body portion 201 shown in FIG. 8.

Unlike the slide bar 600 shown in FIG. 9A-C, the modified slide bar 600 shown in FIGS. 33A-E may not include clearance holes 615 or a slot 620. Instead, the slide bar 600 may have clearance portions 680 that are configured to provide clearance around the pin cavities 210 and avoid obstructing the pin cavities 210 when the slide bar 600 is in the home position. In the example shown in FIGS. 33A-C, the clearance portions 680 may be semicircular recesses. In other examples, the clearance portions 680 may have any other suitable shape. By not completely surrounding the pin cavities 210, the modified slide bar 600 may be compatible with alternate assembly methods, such as inserting the slide bar 600 through a slot in a side or end portion of the housing 200 that accesses the slide bar pocket 220.

Figure 35B:
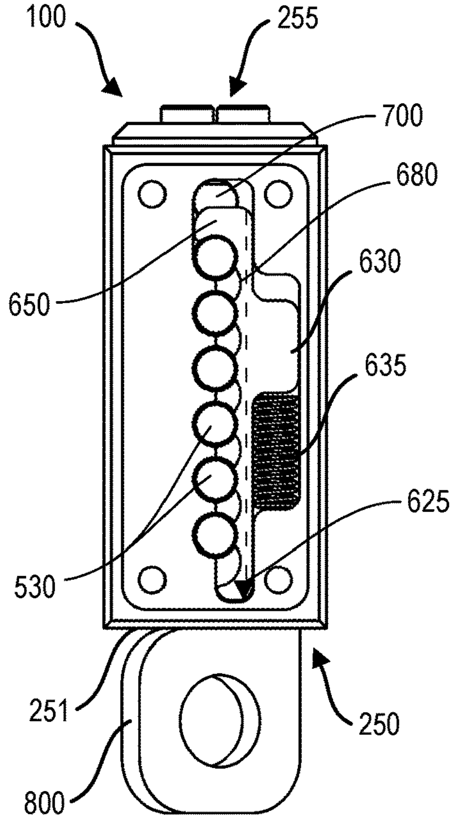
FIG. 35B shows a top view of the lock assembly of FIG. 35A with the cover portion and pin springs removed and the slide bar of FIG. 33A in a pin verification position.

FIG. 35A shows a top view of the lock assembly 100 with the cover portion 202 and pin springs 400 removed. The lock assembly 100 of FIG. 35A includes the modified body portion 201 of FIG. 34 and the slide bar 600 of FIG. 33A in a home position. FIG. 35B shows a top view of the lock assembly of FIG. 35A with the cover portion 202 and pin springs 400 removed and the slide bar 600 of FIG. 33A in a pin verification position. The quantity and spacing of the clearance portions 680 of the slide bar 600 may correspond to the quantity and spacing of the pin cavities 210. The clearance portions 680 of the slide bar 600 may permit unobstructed movement of the pin stacks 500 within the pin cavities 210 when the slide bar 600 is in the home position, as shown in FIG. 35A. The slide bar 600 may include pin testing portions 690. The pin testing portions 690 may partially obstruct each of the pin cavities 210 when the slide bar 600 is in the pin verification position, as shown in FIG. 35B. When the correct key 800 is inserted into the keyway 320 of the lock assembly 100, the neck portions 533 of the driver pins 530 may be located within the slide bar pocket 220. When the key 800 is rotated, the pin verification mechanism 120 may advance the slide bar 600 in the slide bar pocket 220. Because the driver pins 530 are narrower at the neck portion 533, the pin verification portions 690 may be able to advance in the slide bar pocket 220 without striking the driver pins 530. FIG. 35B shows the slide bar 600 fully advanced within the slide bar pocket 220 to the pin verification position. If an incorrect key 800 is inserted into the keyway 320, the neck portions 533 of the driver pins 530 will not be aligned in the slide bar pocket 220, and the slide bar 600 would be prevented from advancing in the slide bar pocket 220 due to physical interference between the pin verification portions 690 and the driver pins 530.

The modified slide bar 600 of FIG. 33A may be concealed within the housing 200 and isolated from the opening 205 to prevent an attacker from accessing the slide bar 600 or neck portions 533 of the driver pins 530 by inserting a hand tool through the keyway 320. A separating portion 270 may be provided between the slide bar pocket 220 and the opening 205, similar to the separating portion 270 shown in FIG. 23. The pin verification mechanism 120 may simultaneously verify that each of the plurality of driver pins 530 are in a correct position prior to allowing the plug 300 of the lock assembly 100 to rotate and unlock the lock assembly with a standard key 800.

Figure 37A:
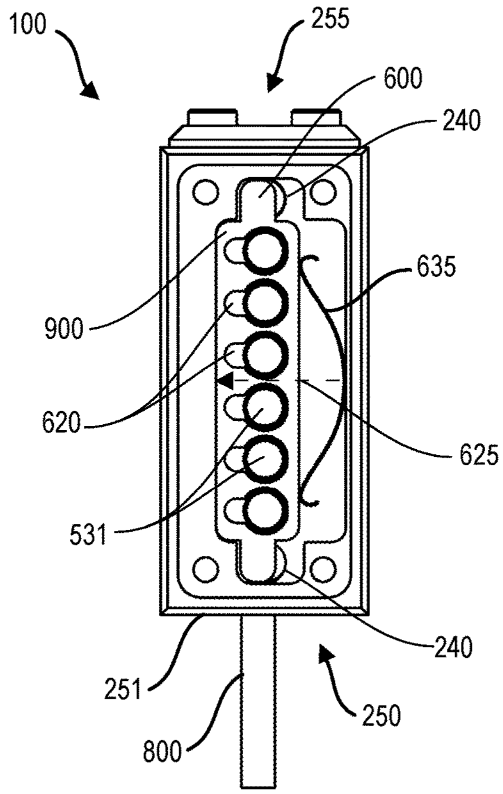
FIG. 37A shows a top view of a lock assembly with the cover portion and pin springs removed and the modified body portion of FIG. 36 and the slide bar of FIG. 40A in a home position.
Figure 37B:
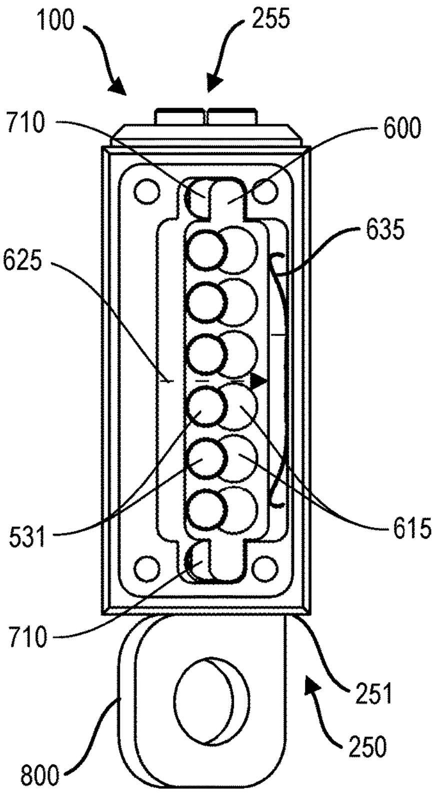
FIG. 37B shows a top view of the lock assembly of FIG. 37A with the cover portion and pin springs removed and the slide bar of FIG. 40A in a pin verification position.

In the examples shown in FIGS. 1 and 35A, the slide bar may be configured to move along a travel path 625 that is substantially parallel to and offset from the plug axis 340 and the centerline 206 of the opening 205. In another embodiment, as shown in FIGS. 37A and 37B, the slide bar 600 may be configured to move along a travel path 625 that is transverse to the plug axis 340 and the centerline 206 of the opening 205 and on a plane 626 that does not intersect the opening 205. In each of the embodiments, the slide bar pocket 220 may be spaced apart from the opening 205 by, for example, an at least partially solid separating portion 270 to prevent an attacker from gaining access to the slide bar directly through the keyway 320. An example of a solid separating portion 270 is shown in FIG. 23.

Figure 36:
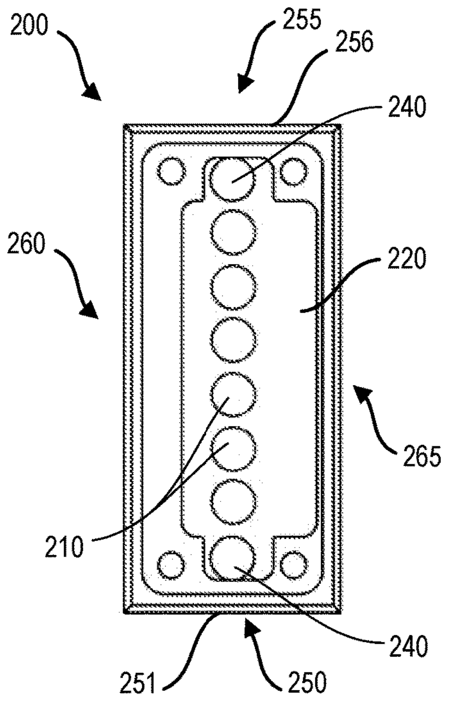
FIG. 36 shows a body portion of a housing with no components installed and an alternate slide bar pocket configuration.

In the example of FIG. 37A, the lock assembly 100 may include a modified body portion 201 as shown in FIG. 36 and a modified slide bar 600 as shown in FIGS. 40A-D. The modified body portion 201 may include a modified slide bar pocket 220 that is configured to receive the slide bar 600 shown in FIGS. 40A-D. The slide bar pocket 220 may surround the pin cavities 210. The slide bar pocket 220 may be enlarged to accommodate the return spring 635, which may be a leaf spring, as shown in FIGS. 37A and 37B.

The body portion 201 of FIG. 37A may include a first cam pin cavity 240 and a second cam pin cavity 240. The first cam pin cavity 240 may be located at or near the rear portion 255 of the body portion 201, as shown in FIG. 36. The second cam pin cavity 240 may be located at or near the front portion 250, as shown in FIG. 36.

Figure 38A:
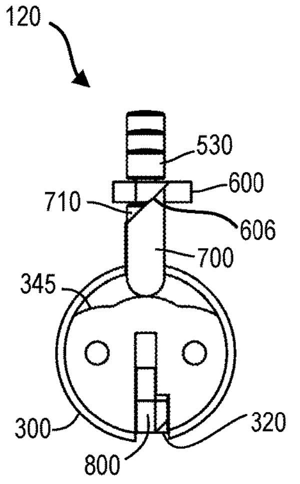
FIG. 38A shows a rear view of a pin verification mechanism of the lock assembly of FIG. 37A with the plug and slide bar in the home position and the plug at a zero-degree orientation.
Figure 38B:
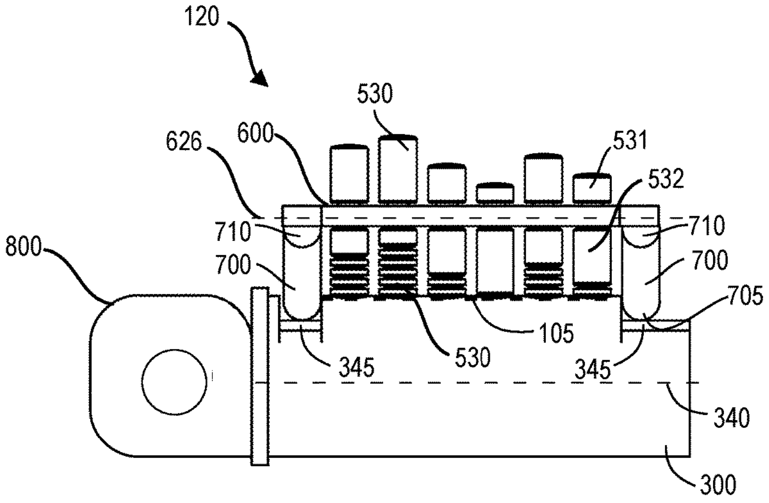
FIG. 38B shows a right side view of the pin verification mechanism of FIG. 38A in the home position.

The lock assembly 100 of FIG. 37A may include a plug 300 having a first cam surface 345 and a second cam surface 345. The first cam surface 345 may be located at or near the front end 305 of the plug 300, as shown in FIG. 38B. The second cam surface 345 may be located at or near a rear end of the plug 300, as shown in FIG. 38B.

Figure 8:
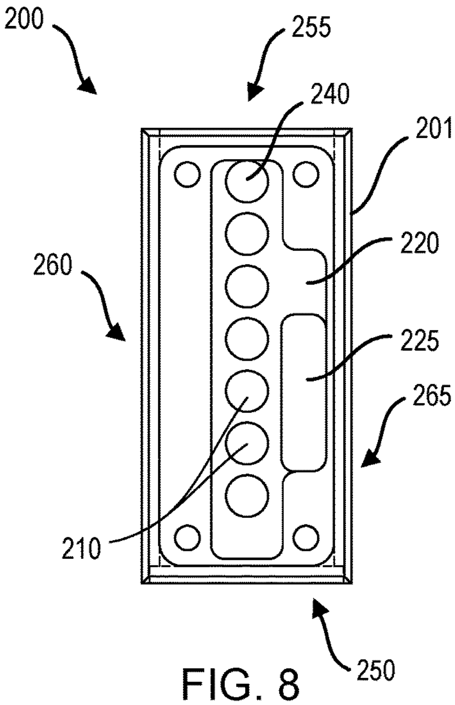
FIG. 8 shows a top view of the body portion of the housing with no components installed.

Aside from the modified slide bar pocket 220 and second cam pin cavity 240, the body portion 201 shown in FIG. 36 may be substantially similar to the body portion 201 shown in FIG. 8.

Figure 40A:
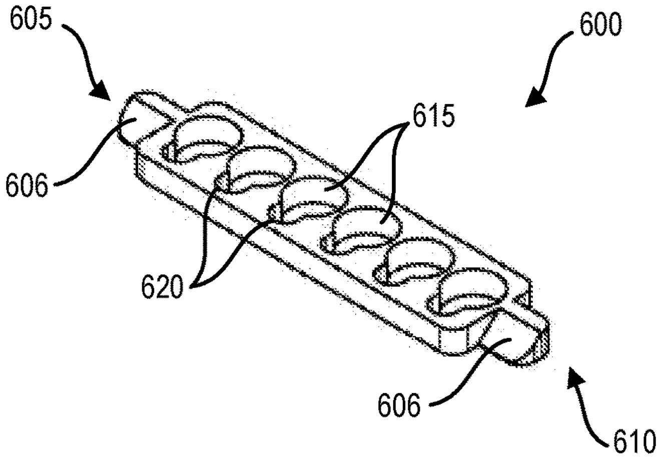
FIG. 40A shows a bottom perspective view of a slide bar.
Figure 40B:
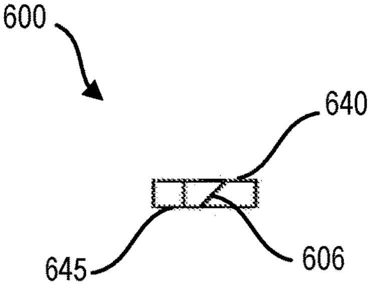
FIG. 40B shows a front view of the slide bar of FIG. 40A.
Figure 40C:
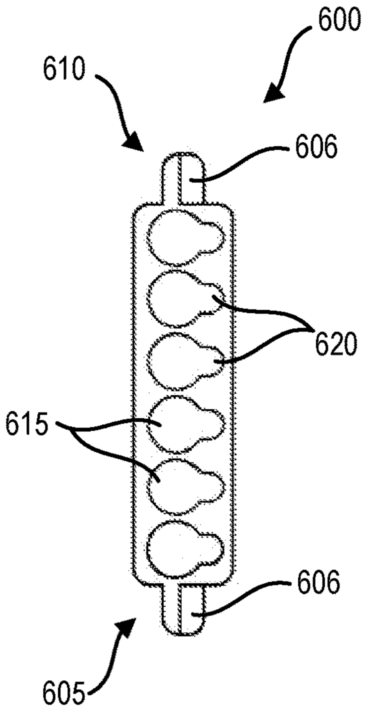
FIG. 40C shows a bottom view of the slide bar of FIG. 40A.
Figure 40D:
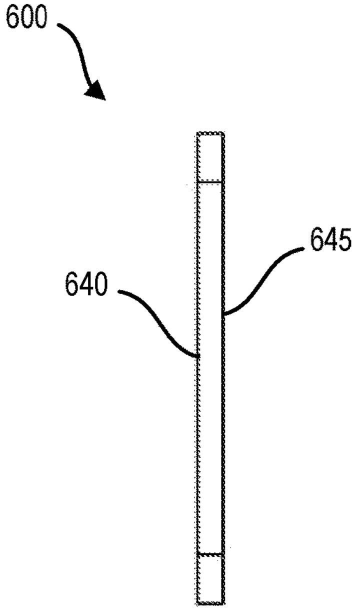
FIG. 40D shows a side view of the slide bar of FIG. 40A.

The slide bar 600 shown in FIGS. 40A-D may include a first end 605, a second end 610, a top surface 640, and a bottom surface 645. The slide bar 600 may include a first beveled surface 606 at or proximate to the first end 605. The slide bar 600 may include a second beveled surface 606 at or proximate to the second end 610. The slide bar may include a plurality of the clearance portions. The plurality of clearance portions may be clearance holes 615. The clearance holes 615 may be arranged in a row having a spacing that corresponds to a spacing of the pin cavities 210 in the housing 200. Each clearance hole 615 may be intersected by a slot 620. The slide bar 600 may have a slot 620 extending from each clearance hole 615, as shown in FIG. 40C. Each slot 620 may extend in a direction that is orthogonal to a centerline of the slide bar that intersects a center of each of the plurality of clearance holes. When the slide bar 600 is in the home position, as shown in FIG. 37A, the clearance holes 615 may be located over the pin cavities 210, thereby allowing the pin stacks 500 to move up and down in the pin cavities 210 without contacting the slide bar 600. When the slide bar 600 is in the pin verification position, as shown in FIG. 37B, the first and second cam pins 700 may force the slide bar 600 to a pin verification position, in which the slots 620 partially obstruct the pin cavities 210 to simultaneously test whether the neck portion 533 of all the driver pins 530 are at proper positions (e.g., heights) within the pin cavities 210.

Figure 39A:
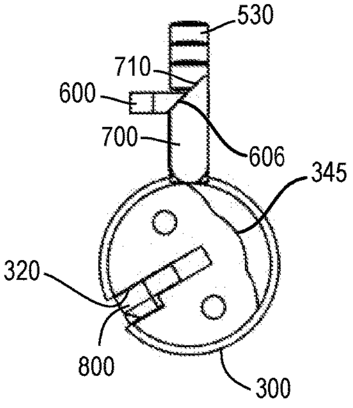
FIG. 39A shows a rear view of the pin verification mechanism of the lock assembly of FIG. 37A with the plug and slide bar in the pin verification position.
Figure 39B:
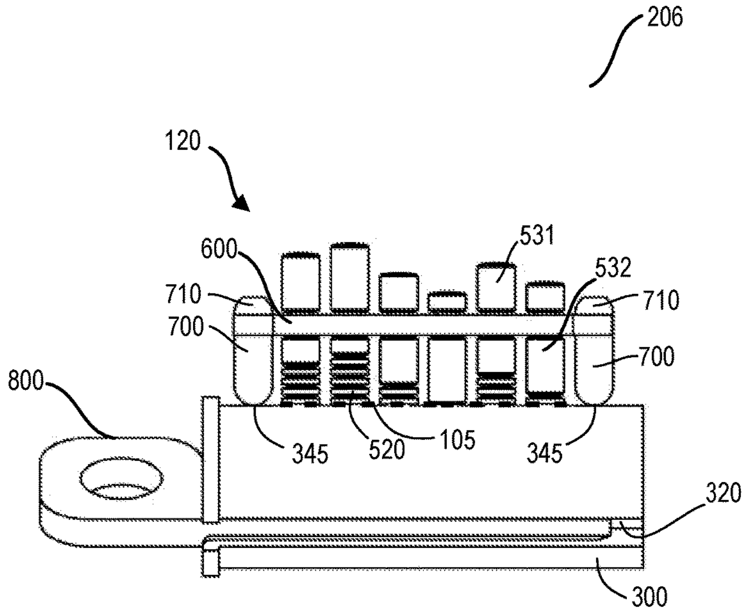
FIG. 39B shows a right side view of the pin verification mechanism of FIG. 39A in the pin verification position.

The lock assembly 100 of FIG. 37 may include a pin verification mechanism configured to advance the slide bar 600 from a home position to a pin verification position. FIG. 38A shows a rear view of the pin verification mechanism 120 of FIG. 37A in the home position. FIG. 38B shows a right side view of the pin verification mechanism 120 of FIG. 37A in the home position. FIG. 39A shows a rear view of the pin verification mechanism 120 of FIG. 37B in the pin verification position. FIG. 39B shows a right side view of the pin verification mechanism 120 of FIG. 37B in the pin verification position. The pin verification mechanism 120 includes a first cam pin 700 and a second cam pin 700. The pin verification mechanism 120 may include a first cam surface 345 and a second cam surface 345. The slide bar 600 may include a first beveled surface and a second beveled surface. When the correct key 800 is inserted into the keyway 320 and rotated, the pin verification mechanism 120 will advance the slide bar 600 from the home position toward the pin verification position. When an incorrect key is inserted into the keyway 320 and rotated, the slide bar 600 will not fully advance to the pin verification position due to physical interference between the slide bar 600 and one or more of the driver pins 530. By contrast, when the correct key 800 is inserted into the keyway 320 and rotated, the slide bar 600 will fully advance to the pin verification position, as shown in FIGS. 37B, 39A, and 39B, and each slot 620 will be in contact with or proximate to a neck portion 533 of a corresponding driver pin 530.

It is understood that the invention is not confined to the particular construction and arrangement of parts herein illustrated and described, but embraces such modified forms thereof as come within the scope of the claims.

The foregoing description has been presented for purposes of illustration and description. It is not intended to be exhaustive or to limit the claims to the embodiments disclosed. Other modifications and variations may be possible in view of the above teachings. The embodiments were chosen and described to explain the principles of the invention and its practical application to enable others skilled in the art to best utilize the invention in various embodiments and various modifications as are suited to the particular use contemplated. It is intended that the claims be construed to include other alternative embodiments of the invention except insofar as limited by the prior art.

What is claimed is:

1. A pick-resistant lock assembly comprising:

a housing comprising a cylindrical opening and a plurality of pin cavities formed in the housing, the plurality of pin cavities intersecting the cylindrical opening and being substantially orthogonal to a centerline of the cylindrical opening;

a plug rotatably mounted within the cylindrical opening, the plug comprising a plug axis and a keyway extending along the plug axis, the plug comprising a plurality of pin openings extending from the keyway through an outer surface of the plug, each pin opening corresponding to and aligned with one of the plurality of pin cavities when the plug is in a home position;

a slide bar pocket concealed within the housing, the slide bar pocket separated from the cylindrical opening by a separating portion of the housing, the slide bar pocket intersecting each of the plurality of pin cavities, the slide bar pocket at least partially surrounding each of the plurality of pin cavities, and a pin verification mechanism concealed within the housing and comprising a slide bar, the slide bar positioned within the slide bar pocket, the slide bar comprising a plurality of clearance portions, each clearance portion corresponding to one of the plurality of pin cavities when the plug is in a home position, wherein the pin verification mechanism converts rotational movement of the plug into translational movement of the slide bar to facilitate pin verification before allowing the plug to rotate and unlock the lock assembly, wherein the slide bar is configured to slide within the slide bar pocket from the home position to a pin verification position when the plug is rotated, wherein the plurality of clearance portions are misaligned with the plurality of pin cavities and the slide bar is at least partially obstructing each of the plurality of pin cavities when the slide bar is in the pin verification position.

2. The pick-resistant lock assembly of claim 1, wherein the slide bar is configured to move along a travel path within the slide bar pocket, the travel path being substantially parallel to the centerline of the cylindrical opening in the housing and located on a plane that does not intersect the cylindrical opening.

3. The pick-resistant lock assembly of claim 1, wherein the slide bar is inaccessible to an attacker inserting a hand tool through the keyway when one of a plurality of driver pins is installed in each of the plurality of pin cavities.

4. The pick-resistant lock assembly of claim 1, further comprising a plurality of driver pins, each of the plurality of pin cavities housing one of the plurality of driver pins, each driver pin comprising an upper portion, a lower portion, and a neck portion located between the upper portion and the lower portion, the neck portion having a diameter that is less than a diameter of the upper portion and less than a diameter of the lower portion.

5. The pick-resistant lock assembly of claim 4, wherein the plurality of clearance portions comprises a plurality of clearance holes, each clearance hole having a diameter equal to or greater than a diameter of a corresponding pin cavity, wherein the slide bar further comprises a slot connecting the plurality of clearance holes, the slot having a width less than the diameter of each of the plurality of clearance holes, wherein the slot has a width greater than the diameter of the neck portion of each driver pin.

6. The pick-resistant lock assembly of claim 4, wherein each of the plurality of driver pins is substantially symmetrical along a centerline and can spin within a respective pin cavity without altering operation of the pin verification mechanism.

7. The pick-resistant lock assembly of claim 1, wherein the pin verification mechanism further comprises a return spring positioned within a return spring pocket in the housing, the return spring having a first end in contact with a surface of the return spring pocket and a second end in contact with the slide bar.

8. The pick-resistant lock assembly of claim 1, wherein the pin verification mechanism further comprises:

a cam surface on an exterior surface of the plug;

a cam pin cavity in the housing, the cam pin cavity extending from the slide bar pocket to the cylindrical opening, the cam pin cavity having a centerline that is substantially orthogonal to the centerline of the cylindrical opening; and a cam pin positioned within the cam pin cavity, the cam pin having a first end and a second end opposite the first end, the first end having a rounded surface in contact with the cam surface, the second end having a first beveled surface in contact with a second beveled surface of the slide bar, wherein rotation of the plug from the home position toward the pin verification position causes the cam surface to rotate about the plug axis, which causes the first beveled surface of the cam pin to move radially outward from the plug axis, which causes the first beveled surface to slide against a second beveled surface of the slide bar to advance the slide bar along a linear travel path that is parallel to the plug axis.

9. The pick-resistant lock assembly of claim 1, wherein rotation of the plug from the home position toward the pin verification position causes a cam surface of the plug to rotate about the plug axis and causes a cam pin to move radially outward from the plug axis and against the slide bar to advance the slide bar along a linear travel path.

10. A lock assembly comprising:

a housing comprising a plug opening that is generally cylindrical, a plurality of pin cavities intersecting the plug opening and being orthogonal to a centerline of the plug opening, a cam pin cavity intersecting the plug opening and being orthogonal to the centerline of the plug opening, and a slide bar pocket intersecting a centerline of each of the plurality of pin cavities and intersecting the cam pin cavity;

a plug rotatably mounted in the plug opening, the plug comprising a plug axis, a plurality of pin openings arranged in a row and each having a centerline substantially orthogonal to the plug axis, a cam surface on an exterior surface of the plug, and a keyway extending from a front portion of the plug toward a rear portion of the plug and intersecting each of the plurality of pin openings;

a cam pin positioned in the cam pin cavity, the cam pin having a first end and a second end, the first end in contact with the cam surface, the second end having a first beveled surface; and a slide bar in the slide bar pocket, the slide bar comprising a second beveled surface in contact with the first beveled surface of the cam pin, a plurality of clearance holes each having a diameter equal to or greater than a diameter of a corresponding pin cavity, and a slot connecting the plurality of clearance holes, the slot having a width less than the diameter of each of the plurality of pin cavities, wherein rotating the plug from a home position to a pin verification position causes the cam surface to rotate about the plug axis and the cam pin to ride on the cam surface and move radially outward from the plug axis within the cam pin cavity causing the first beveled surface to press against the second beveled surface thereby moving the slide bar linearly from the home position to the pin verification position.

11. The lock assembly of claim 10, wherein the lock assembly is compatible with a standard key having a bitting cut on a top surface.

12. The lock assembly of claim 10, further comprising a plurality of driver pins, each driver pin comprising a lower portion, an upper portion, and a neck portion between the lower portion and the upper portion, wherein each neck portion has a diameter less than a width of the slot.

13. The lock assembly of claim 10, wherein the slide bar is configured to move linearly along a travel path that extends from front-to-rear within the housing.

14. The lock assembly of claim 10, wherein the cam pin rides on the cam surface along a cam pin pathway that extends from a first point corresponding to the home position to a second point corresponding to the pin verification position.

15. A pick-resistant lock assembly comprising:

a housing comprising an opening configured to receive a rotatable plug, a slide bar pocket concealed within the housing and separated from the opening by a separating portion of the housing, a pin cavity intersecting the slide bar pocket and extending through the separating portion to the opening; and a pin verification mechanism concealed in the housing and comprising a slide bar, the slide bar positioned in the slide bar pocket, wherein the slide bar is configured to move between a home position and a pin verification position within the slide bar pocket in response to rotation of the plug, wherein the slide bar partially obstructs the pin cavity when the slide bar is in the pin verification position.

16. The lock assembly of claim 15, wherein the slide bar is configured to move along a travel path that extends from the home position to the pin verification position, the travel path being substantially parallel to a centerline of the opening and in a plane that does not intersect the opening.

17. The lock assembly of claim 15, wherein the slide bar is configured to move along a travel path that extends from the home position to the pin verification position, the travel path that is substantially transverse to a centerline of the opening and in a plane that does not intersect the opening.

18. The lock assembly of claim 15, wherein the slide bar does not obstruct the pin cavity when the slide bar is in the home position.

19. The lock assembly of claim 15, wherein the slide bar pocket at least partially surrounds a middle portion of the pin cavity.

20. The lock assembly of claim 15, further comprising:

a driver pin in the pin cavity, the driver pin comprising an upper portion, a lower portion, and a neck portion between the upper portion and the lower portion; and a clearance hole and a slot in the slide bar, the slot intersecting the clearance hole, wherein a diameter of the clearance hole is greater than a diameter of the upper portion and greater than a diameter of the lower portion, and wherein a diameter of the neck portion is less than a width of the slot, wherein the upper portion is positioned within the clearance hole when the slide bar is in the home position, and wherein the neck portion is positioned within the slot when the slide bar is in the pin verification position.

* * * * *